(12) United States Patent
Dheur et al.

(10) Patent No.: US 6,289,958 B1
(45) Date of Patent: *Sep. 18, 2001

(54) TIRE WITH TREAD CONTAINING ELECTRICALLY CONDUCTIVE STITCHED THREAD

(75) Inventors: Jean Luc Dheur; Pierre Marie Jean Dauvister, both of Arlon (BE)

(73) Assignee: The Goodyear Tire & Rubber Company, Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,713

(22) Filed: Oct. 19, 1998

(51) Int. Cl.⁷ .............................. B29D 30/52; B60C 1/00; B60C 11/00; B60C 11/14

(52) U.S. Cl. .................................... 152/152.1; 152/209.5; 152/211; 152/212; 152/DIG. 2; 156/114; 156/128.6

(58) Field of Search ............................ 152/152.1, 209.5, 152/DIG. 2, 210, 211, 212, 168, 169; 156/114, 123, 124, 128.1, 128.6

(56) References Cited

U.S. PATENT DOCUMENTS

| | | | |
|---|---|---|---|
| 1,797,545 | * | 3/1931 | Churcher . |
| 2,267,503 | * | 12/1941 | Lytle . |
| 2,605,199 | * | 7/1952 | Hawkinson ........................ 156/114 |
| 2,641,294 | * | 6/1953 | Bridgefield . |
| 3,314,839 | * | 4/1967 | Hough .............................. 152/209.5 |
| 4,031,990 | * | 6/1977 | Matsui et al. . |
| 5,518,055 | * | 5/1996 | Teeple et al. ...................... 152/152.1 |
| 5,718,781 | * | 2/1998 | Verthe et al. ...................... 152/152.1 |
| 5,937,926 | * | 8/1999 | Powell .............................. 152/152.1 |
| 5,942,069 | * | 8/1999 | Gerresheim et al. .............. 152/152.1 |

FOREIGN PATENT DOCUMENTS

| | | | |
|---|---|---|---|
| 597008 | * | 3/1978 | (CH) .............................. 152/DIG. 2 |
| 4417914 | * | 11/1995 | (DE) . |
| 2285258 | | 4/1976 | (EP) . |
| 658452 | * | 6/1995 | (EP) .............................. 152/DIG. 2 |
| 732229 | * | 9/1996 | (EP) .............................. 152/DIG. 2 |
| 0787604 | | 1/1997 | (EP) . |
| 878330 | * | 11/1998 | (EP) .............................. 152/DIG. 2 |
| 1198271 | * | 12/1959 | (FR) . |
| 1251273 | * | 12/1960 | (FR) . |
| 1279913 | * | 11/1961 | (FR) . |
| 1546488 | * | 11/1968 | (FR) . |
| 544757 | | 2/1941 | (GB) . |
| 57-194109 | * | 11/1982 | (JP) . |
| 1-293208 | * | 11/1989 | (JP) . |
| 3-7602 | * | 1/1991 | (JP) .............................. 152/209.5 |

OTHER PUBLICATIONS

Abstract for French 2285258.*
Abstract for Europe 787604.*
European Search Report.

* cited by examiner

Primary Examiner—Steven D. Maki
(74) Attorney, Agent, or Firm—Henry C. Young, Jr.

(57) ABSTRACT

The invention relates to a rubber tire, and its preparation, composed of carbon black reinforced rubber carcass with an outer, circumferential rubber tread construction of a rubber composition having a relatively high electrical resistivity. The tire tread construction has an electrically conductive filamentary thread stitched through the tread construction and extending between the inner surface of the tread to its outer surface. An electrically conductive path is thereby created through the tire tread.

29 Claims, 3 Drawing Sheets

TIRE WITH TREAD CONTAINING ELECTRICALLY CONDUCTIVE STITCHED THREAD

FIELD

The invention relates to a rubber tire, and its preparation, composed of carbon black reinforced rubber carcass with an outer, circumferential rubber tread construction of a rubber composition having a relatively high electrical resistivity. The tire tread construction has an electrically conductive filamentary thread stitched through the tread construction and extending between the inner surface of the tread to its outer surface. An electrically conductive path is thereby created through the tread and from the outer surface of the tread to the carcass of the tire.

In practice, the bottom surface of the tread construction connects with at least one other carbon black reinforced rubber component of the tire carcass to thereby provide a relatively electrically conductive path from the outer surface of the tire tread to the bead portion of the tire and, thence, to a metal rim onto which the tire is designed to be mounted.

BACKGROUND

Pneumatic rubber tires are conventionally prepared with a rubber tread which can be a blend of various rubbers which are, typically, sulfur-curable or sulfur-cured as the case may be, diene-based elastomers.

Sometimes the treads of rubber tires are prepared of a cap/base construction in which the outer portion of the tread is the cap and the underlying part of the tread between the tread cap and the supporting tire carcass is its base. The cap portion is usually designed to be ground-contacting and, thus, has associated properties and the base portion generally overlays the tire carcass and is usually designed to support the cap, therefore, not to be ground-contacting. Such cap/base constructions are well known to those skilled in the art.

The rubber compositions for most components of a tire are typically reinforced with a substantial amount of carbon black reinforcing filler and thereby have a relatively low electrical resistivity for dissipating static electricity to the road from a moving vehicle which utilize such tires. It is believed that such phenomenon is well known to those having skill in such art.

However, it is sometimes desired to provide a tread of a rubber composition which contains a substantial amount of relatively non-electrically conductive reinforcing filler, such as for example precipitated silica, and thereby only a minor amount of carbon black reinforcement, if any, in an amount, for example, of less than 20 phr. Such a tread has a relatively high electrical resistivity because of the low level of carbon black and, thus, has a resistance to dissipating vehicular generated static electricity through the tire to the road. In practice, the relatively high electrical resistivity rubber composition may be the unitary tread, the tread cap and/or tread base. It is believed that such phenomenon is well known to those having skill in such art.

Various methods of providing paths of reduced electrical resistance to the outer surface of a tread cap have been suggested. For example, see U.S. Pat. Nos. 1,797,545, 2,267,503 and 2,641,294; and the following patent publications: French 1,198,271, 1,251,273, 1,279,913 and 1,546,488; German DE 44 17914; Swiss 597,008 and Japanese 57-194,109 and 1-293,208.

Accordingly, for a tire tread construction where unitary tread composition, or tread cap and/or tread base rubber composition has a relatively high electrical resistivity, particularly where it contains only up to about 20 phr of carbon black, it is desirable to provide a suitable path of relatively low electrical resistance from the outer surface of the tire tread to the inner surface of the tire tread, or in a case of a tire of cap/base construction, to the inner surface of the tread cap or tread base, as the case may be.

As used herein, the terms "substantially, or quantitatively, reinforced with reinforcing fillers which are electrically relatively non-conductive such as, for example, silica", and the like are generally used in conjunction with a tire tread, or tread cap and/or tread base in the case of tread of cap/base construction, which contains about 30 to about 100, sometimes preferably about 30 to about 90 phr, of electrically non-conductive filler, and only a minimal amount, if any, of carbon black in which the carbon black is present in not more than about 20 phr. Sometimes, the ratio of non-conductive filler to carbon black may be at least 2/1 and sometimes even at least 10/1.

By the term "carbon black reinforced", it is meant that the rubber components of the tire carcass rubber which are carbon black reinforced, contain a quantitative amount of carbon black reinforcement, normally at least 25 phr, and a minimal amount, if any, of relatively non-electrically conductive reinforcing filler such as, for example, silica. The weight ratio of carbon black to such non-conducting filler might be, for example, at least 5/1.

In the description of this invention, treads of unitary rubber composition and treads of a cap/base rubber compositions are presented. Usually the tread cap rubber composition differs from the tread base rubber composition, particularly since the tread cap is intended to be road-contacting and requires a rubber composition of high abrasion durability. This would be understood by one having skill in such art. Tread wings are often used in a tread construction which extend to and usually over a portion of a tire sidewall. In the description and claims of this invention, while it is not intended to exclude such tread wings, the description of a unitary tread rubber composition and tread cap/base rubber compositions is generally directed to the portion of the tread other than the tread wings, with an understanding that a tread wing rubber composition may be the same or different than that of the unitary tread rubber or the tread cap or base rubber composition.

A footprint of a tire tread is that portion of the tread which is intended to contact the ground when in use. Such footprint, insofar as the description of this invention is concerned, refers to the tire tread whether or not the tire is mounted on a rim or on a vehicle under loaded conditions.

The term "phr" as used herein, and according to conventional practice, refers to "parts of a respective material per 100 parts by weight of rubber". In the description herein, rubber and elastomer are used interchangeably.

In the description herein, the term "vulcanized" or "vulcanizable", may, on occasion, be used interchangeably with the terms "cured" and "curable".

SUMMARY AND PRACTICE OF THE INVENTION

In accordance with this invention, a pneumatic tire is provided which is composed of a carbon black reinforced rubber carcass, which contains two individual sidewalls, and two spaced apart bead portions, and which supports a peripheral, circumferential rubber tread of (a) a unitary rubber composition having a high electrical resistivity or of (b) a cap/base construction, preferably of a co-extruded cap/base construction, wherein said tread cap and/or tread base rubber composition is of a high electrical resistivity; wherein the outer surface of the tread, or tread cap as the case may be, is designed to be ground-contacting, and wherein said high electrical resistivity of said rubber composition(s) is evidenced by the tire having an electrical resistance of at least 20,000 meg-ohms according to Test WDK 110; characterized in that said tread has an electrically conductive filamentary, flexible, thread stitched through said tread to create an electrically conductive path from the outer surface of the tread designed to be ground-contacting to an electrically conductive tire carcass, and to thereby form a tire having an electrical resistance in a range of about one ohm to about 10,000 mega-ohms according to Test WDK 110.

Therefore, the above description is for a first characterization of the tire with a tread having a high electrical resistivity without an electrically conductive thread stitched through the tread, thus, presenting a tire having a high electrical resistance, and a second characterization of the same tire having the electrically conductive thread stitched through the tread, thus, presenting a tire having a substantially lower electrical resistance.

In further accordance with this invention, a process of preparing a tire is provided which comprises stitching an electrically conductive filamentary, flexible thread through an extruded, unvulcanized rubber tread strip; wherein said tread strip is of (a) a unitary rubber composition containing less than 20 phr of carbon black reinforcement or of (b) a cap/base construction wherein the rubber composition of said tread cap or said tread base contains less than 20 phr of carbon black reinforcement; building said tread strip onto a carbon black reinforced rubber tire carcass to create an assembly thereof and vulcanizing said assembly in a suitable mold at an elevated temperature to form a tire; wherein said tire has an electrical resistance in a range of about one ohm to about 10,000 mega-ohms according to Test WDK 110.

In one significant aspect of the process of stitching of the thread through the unvulcanized tread stock is that the stitching can be specifically placed, or positioned, at a desired location in the tread stock which will eventually become a tread rib or a tread lug which is designed to be ground-contacting.

Accordingly, a process is provided wherein the stitching of the filament is positioned in the tread stock by indexing the placement of the stitches with a predetermined location of a tire tread rib or tire tread lug designed to be ground-contacting and which are formed as the tire carcass/tread stock assembly is molded and cured.

In practice, said thread is contemplated to be in a form of a plurality of continuous stitchings which extend circumferentially around the tread to provide at least one stitching at a footprint of the tire tread intended to be ground-contacting, wherein each stitching extends through the tread in a manner that a segment of each stitching of the thread extends over a portion of the inner surface of said tread and a segment of each stitching of the thread extends over a portion of the outer surface of the tread intended to be ground-contacting.

In the practice of this invention, various stitching configurations may be used and it is not intended that the method of stitching be limited or that the seam created by said stitching be limited to a particular stitching configuration, recognizing that various industrial sewing devices from various manufactures provide a multitude of stitching configurations. For example, the stitching may be of an open loop or closed loop construction, recognizing that various industrial sewing machines may provide a multitude of variations of open loop and closed loop sewing configurations. Indeed, it is contemplated that an industrial sewing machine may simultaneously apply two threads to the sewing operation where one thread may pass through the eye of the needle of the machine and another thread is fed from a spool on the opposite side of the piece to be sewed.

For example, for closed loop stitching, it is contemplated that the stitchings may form a series of connecting closed loops of the thread which extend substantially circumferentially around the tire tread and which may be created, for example, by stitching the thread from the inner surface of the unitary tire tread or tread base, as the case may be, to the outer surface of the tire tread construction, where the segments of the thread loop oppose each other on the outer surface of the tread and on said inner surface of the tread. It is intended that closed loop stitching, for the purposes of this invention, not be limited to such described stitching but can be any of such stitching as may be applied by a particular sewing machine being utilized.

In practice, the segments of the closed loop thread stitching which extend over a portion of the outer surface of said tread intended to be ground-contacting may be cut, ground or abraded away to form a plurality of sequential open loop thread stitchings which are connected by their segments on the inner surface of the tread, wherein at least one end of the thread of the open loops terminates at the outer surface of the tread intended to be ground-contacting.

Alternatively, the thread may be open loop stitched through the tread construction to create what might sometimes be referred to as a "rectangular wave configuration of the thread" in a sense that segments of the thread on the outer surface of the tread do not directly oppose segments on an inner surface of the tread. Thus, the stitched thread configuration does not have an appearance of closed loops. It is intended that open loop stitching, if used, not be limited to this specific example, since various variations might be available depending upon a sewing method or machine contemplated.

It is believed that, in general, closed loop and open loop stitch construction are well known to those having a skill in such art, albeit there are many complexities of sewing techniques and configurations used by various industrial sewing machines. As hereinbefore discussed, it is not intended that the invention be necessarily limited to a specific sewing technique or configuration.

In one aspect of the invention, the segment of a closed or an open loop of the stitching on the outer surface of the tread may be cut, ground or abraded away so that the ends of the thread terminate at the surface of the tread. The stitched configuration becomes a series of open loops which are unconnected at the outer surface of the tire tread. Thus, the thread or such stitching extends to the outer surface of the tread construction wherein the open ends of the thread loop terminate at and are positioned on the outer surface of the tread construction which is designed to be ground-contacting.

In one aspect of the invention, the relatively insulative (high electrical resistivity) rubber composition portion of said tread may contain about 30 to about 100 phr of electrically non-conductive (electrically insulative) reinforcing fillers such as, for example, precipitated silica and from zero, or about 5 phr to about 20 phr of carbon black.

In one aspect, it is sometimes preferable that, for the relatively electrically insulative rubber composition of the tire tread, the weight ratio of silica to carbon black, if carbon black is used, is at least about 1.2/1 and preferably at least 2/1 and sometimes at least 10/1.

Various materials may be used for filamentary thread for the stitching of this invention so long as they have a relatively low electrical resistance. It is to be understood that some filamentary materials would have greater or lesser extended physical longevity depending somewhat upon the tire type, use and service. For example, filaments of carbon fibers, synthetic textile fibers, including cords thereof, (such as for example, nylon, aramid, polyester, rayon) which are electrically conductive (ie: made electrically conductive by an inclusion of electrically conductive element or material such as, for example a dispersion within its composition or coating, shell or sheath of electrically conductive material), ultra high molecular weight polyethylene which contains a dispersion of carbon black (wherein said polyethylene has a weight average molecular weight in a range of about 4 million to about 7 million), as well as filamentary threads of other electrically conductive materials. This invention is not intended to be limited to the above exemplary materials, although, preferably, in most cases, it is desired that the thread is of a non-metallic fiber although the material of one or more of the filaments may contain a particulate metal dispersion.

The WDK 110 Test is a procedure to measure the electrical resistance of a tire mounted on an electrically conductive metal rim (i.e.: a steel rim). In the Test, the footprint of the tire tread is pressed against an electrically conductive metal plate (ie: a steel plate). The plate and the rim are connected via copper wires to an instrument. A voltage is applied and the electrical resistance between the plate and the rim is read from an ohmmeter on the instrument. A reference to the WDK 110 Test may be found in WDK Leitlinien Index (May, 1998).

The electrically conductive threads for use in this invention may be composed of a unitary filament (monofilament) or a multiplicity of individual filaments cabled (twisted) together.

As hereinbefore pointed out, the threads may be stitched through the tread construction by various methods and, it is desirable that the threads are mechanically stitched by suitable automated machine.

While not limited thereto, various diene-based elastomers and combinations thereof may be used in the tire tread construction components (ie: the unitary tire tread, tread cap and tread base).

Such diene-based elastomers may include homopolymers and copolymers of conjugated diene hydrocarbons and copolymers of conjugated dienes and aromatic vinyl compounds such as, for example, styrene and alpha-methylstyrene. Representative of various dienes are, for example, isoprene and butadiene. Representative of various elastomers are, for example, cis 1,4-polyisoprene (natural and synthetic), cis 1,4-polybutadiene, styrene/butadiene copolymers as emulsion polymerization prepared copolymers and as organic solution polymerization prepared copolymers, isoprene/butadiene copolymers, styrene/isoprene copolymers, 3,4-polyisoprene, relatively high vinyl polybutadiene containing about 30 to about 85 percent vinyl content and styrene/isoprene/butadiene terpolymers.

In practice, the tire may be constructed, in part, by building an extruded tread stock onto a rubber tire carcass. Such construction and building process are well known to those having skill in such art.

Tire assembly is vulcanized in a suitable mold under conditions of elevated temperature, for example, in a range of about 140° C. to about 180° C.

The stitched electrically conductive thread through at least one tire tread component provides a path of relatively low electrical resistance, as compared to a tire tread with relatively high electrical resistance and, thus, a path for dissipation of static electricity between the ground and the tire bead portion and, thence, the metal rim of the vehicular wheel on which the tire may be mounted.

In practice, after the outer surface of the tire tread, as it is used in service, becomes worn so that a portion of the electrically conductive thread is also at least partially worn away, the path for dissipation of static electricity is considered herein as maintained by the exposed portion(s) of the residual thread on the outer surface of the tread cap so that at least a portion of the thread ends are able to touch the ground.

The accompanying drawings are provided for further understanding of the invention, although it is not intended that the invention be limited to the presentation of the drawings.

It is to be understood that the stitching described in the drawings are a very simplified description. As hereinbefore discussed, industrial sewing machines administer many stitching procedures, methods, and resulting configurations of the stitched thread. Thus, it is to be emphasized that the configurations of the stitched thread in the drawings are presented only for a general understanding and that, in practice, the configurations of the stitched thread may substantially differ.

DESCRIPTION OF THE DRAWINGS

FIGS. 3A, 3B and 3C represent a cross-section of the tread stock taken at section 3A—3A of FIG. 1 in which FIG. 3A depicts the electrically conductive thread with an open loop stitching, FIG. 3B depicts the electrically conductive thread with a closed loop and FIG. 3C represents the stitched tread stock in which the thread on the outer surface of the tread has been cut away.

Figure 1:
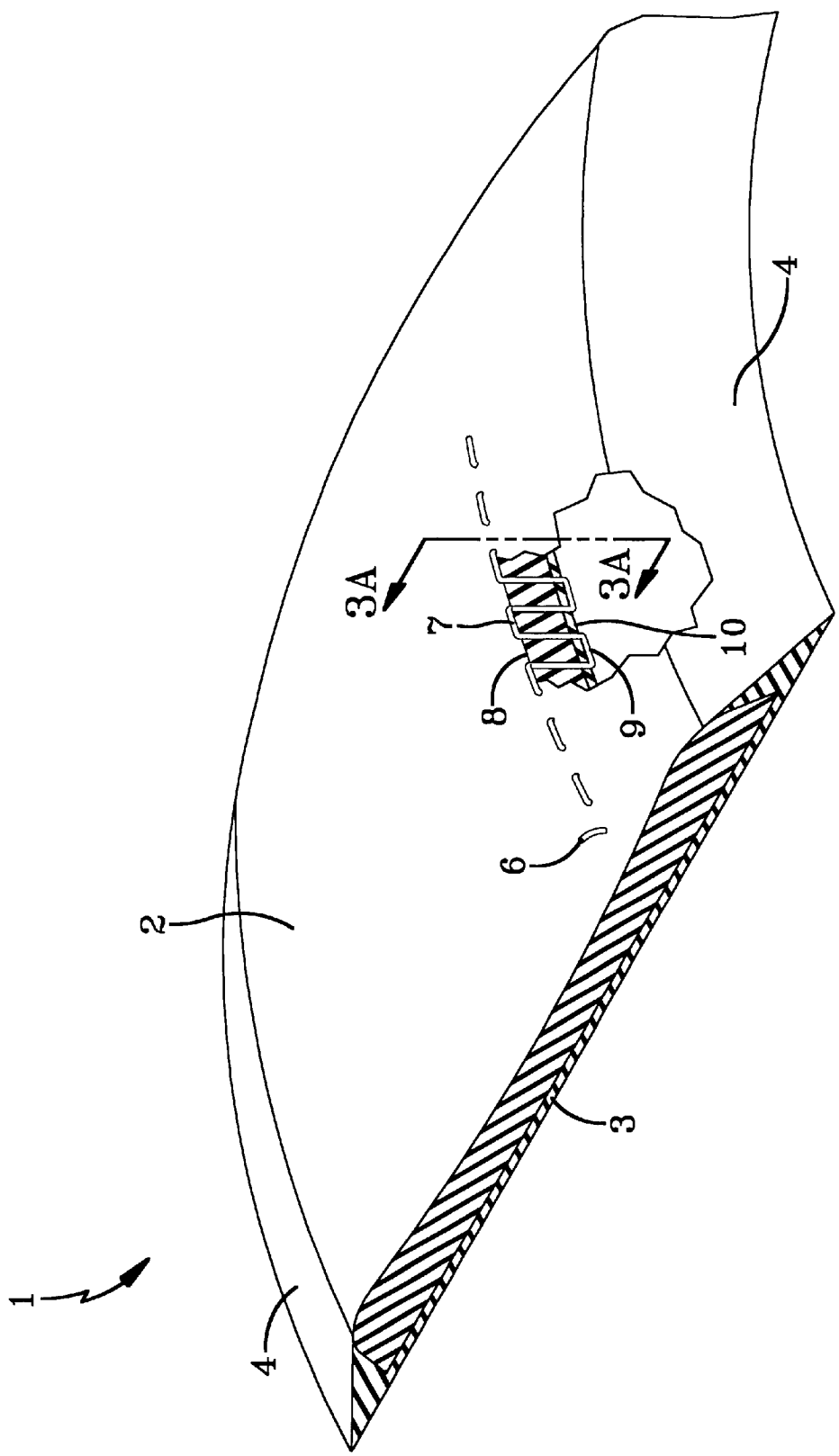
FIG. 1 is a perspective, cross-sectional view of a tire tread stock composite of cap and tread base components together with an electrically conductive thread stitched through the tread stock. It is to be understood that, alternatively, the tread stock may be of a unitary rubber composition instead of a cap/base construction.

Referring to the drawings, a cross-section of unvulcanized rubber tread stock (1) is shown having portions which will become, after building the tire and upon shaping and vulcanizing the tire in a suitable mold, a tread cap (2) having, for this exemplary drawing, a high electrical resistivity, and normally designed to be ground-contacting, a tread base (3) (unless the tire tread stock is of a unitary rubber composition) which underlies the tread and tread wings (4), or what are sometimes referred to as "miniwings", outboard of both the tread cap (2) and tread base (3) and which overlap a portion of the sidewall (5).

It is to be understood that, alternatively, the tread may be provided without the miniwings (4) and that the sidewall (5) may overlap a portion of the tread although, for the purposes of this invention, such construction is not preferred.

Figure 3A:
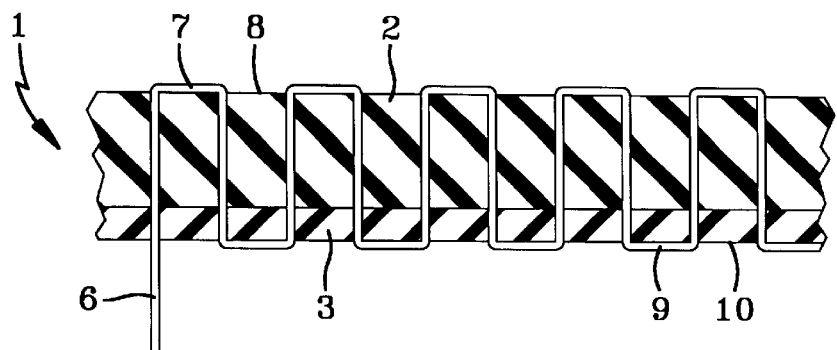
Figure 3B:
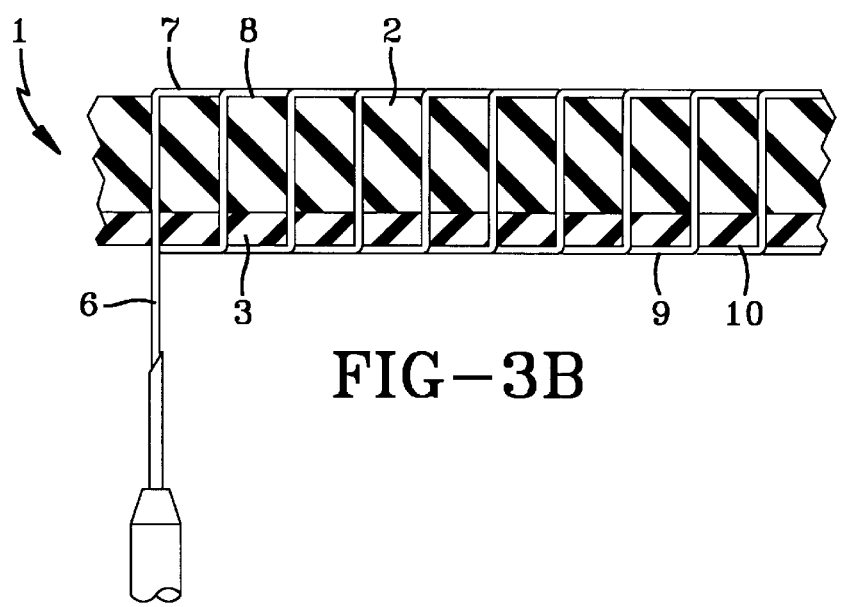
Figure 3C:
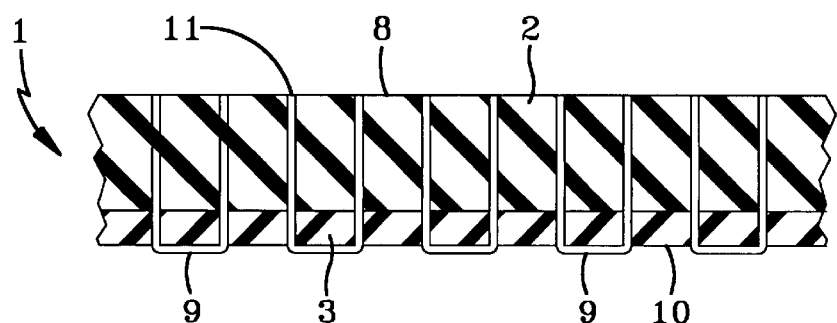

An electrically conductive thread (6) is shown as being stitched through the body of the tread stock (1) and, thus, through both the tread base (3) and tread cap (2) to create an open loop stitching (FIG. 3A) or a closed loop stitching (FIG. 3B) or an open loop stitching where the thread on the outer tread surface has been cut away (FIG. 3C).

It is to be appreciated that FIGS. 3A, 3B and 3C are, for example, only and that many variants of stitching configurations may be used.

For the stitched thread (6), a segment (7) extends over a small portion of an outer surface (8) of the tread cap (2) and a small segment (9) extends over a small portion of the inner surface (10) of the tread base.

Figure 2:
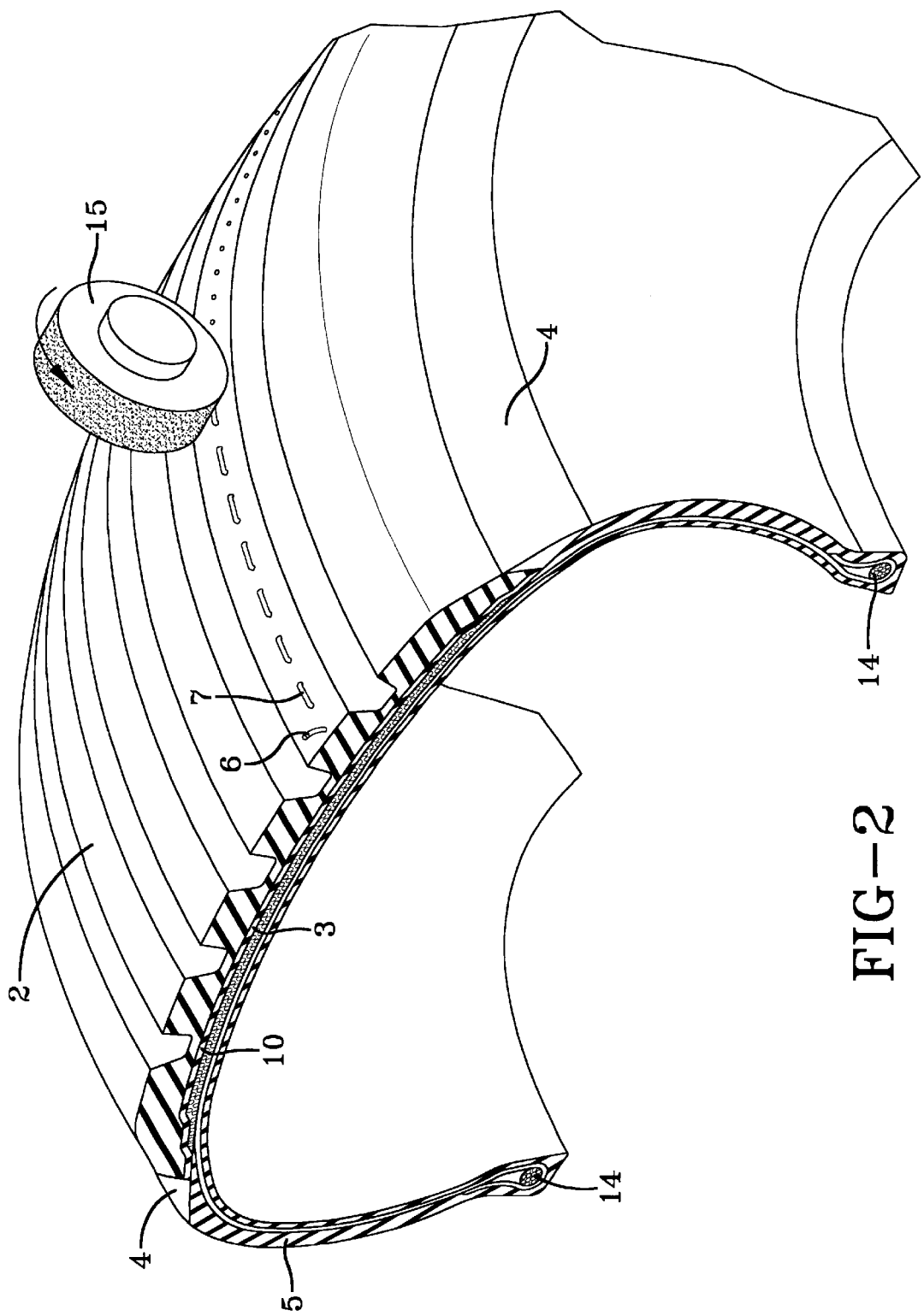
FIG. 2 is a perspective, cross-sectional view of a molded and vulcanized tire with a tread of a rib and groove design of a cap/base construction together with an electrically conductive thread stitched through the tread stock. It is to be understood that, alternatively, the tread stock may be of a unitary rubber composition instead of a cap/base construction.

In one aspect, the outer segment (7) of the closed loop stitching on the outer surface (8) of the unvulcanized tread stock intended to be ground-contacting may be cut away, or on the vulcanized tread may, for example, may be ground away be a grinding or cutting means (15) so that a series of individual, connected, open loops are formed in which only the ends (11) of the thread (6) extend to the outer surface (8) of the tread stock (2) as shown in FIG. 2.

In this manner, and for this example, the stitched thread is shown to provide an electrically conductive path of relatively low electrical resistivity from the outer surface (8) of the tread cap (2) of relatively high electrical resistivity to the inner surface of the tread base (10).

It is to be appreciated that, alternatively, the tread base (3), of a tread of cap/base construction may play the role of a non-electrical conducting rubber composition with a relatively high electrical resistivity.

While the miniwings (4) in FIG. 1 are depicted as being individual rubber components of the tread stock (1), it is to be understood that the miniwings (4) can actually be a unitary extension and the same rubber composition of the tread base (3).

It is to be appreciated that the tread cap (2) of FIG. 1 is substantially reinforced with relatively non-conductive reinforcing filler, such as for example although not limited to silica, namely for this drawing about 20 to about 90 phr of non-conductive reinforcing filler, with only a minor amount of carbon black (i.e.: about 20 or less phr).

Thus, the tread cap (2) has a relatively high electrical resistivity and the stitched thread (6) thereby provides a path of reduced electrical resistivity through the tread stock (1).

For the tread construction of this example, all of the tread components, namely the tread base (3), tread cap (2), and the miniwings (4), in general practice, may be co-extruded together in a multiplex extruder to form the tread strip composite (1).

The tire construction is shaped and vulcanized in a suitable mold to form a tire (12) with the stitched thread (6) on the outer surface (8) of a rib (13) of the tread cap (2), with one example of the stitched version being shown in FIG. 2. As hereinbefore discussed, such stitched configuration is provided for example only.

As the tire, having been mounted and inflated on a suitable electrically conductive rigid metal rim, itself mounted on a wheel of a vehicle, rolls across the ground, a path for electrical dissipation, is created between the rim to the outer surface (8) of the rib (13) of the tread cap (2), and thereby the ground, by the aforesaid stitched thread (6) as it contacts the road.

It is contemplated that, as the outer surface of the tread cap (2) on the outer, ground-contacting surfaces of the tread rib (13) wears away, unless it has already been ground or cut away as hereinbefore discussed, a segment of the thread (7) at the outer tread surface (8) also wears away yet still leaving a portion of the thread (6), particularly the thread ends (11), to contact the road surface.

The creation of an electrically conductive path from the outer surface of a relatively electrically non-conductive tread by stitching of an electrically conductive thread is believed to be novel and inventive. In practice, the filament(s) of the thread may be customized by varying their diameters and selection of compositions to provide various flexibilities and compatabilities with the rubber compositions as well as various electrical resistivities, depending somewhat upon the rubber compositions themselves and the intended use and service of the tire tread itself.

A significant novelty is considered herein to be that the concept of the stitching of the electrically conductive thread through the tread stock does not introduce significant penalties on tire tread stock extrusion capabilities including extruder die modifications, minimal if any, compromises for the tire tread rubber compositions and without complicated additional tire building steps (the building of the tread onto the tire carcass).

A further aspect of the novelty of this invention is that it enables a flexibility in both the positioning of the stitched thread at predetermined specified locations on the tread and, also, a variability of selection and choice of stitching configurations (i.e.: open loop, closed loop, cut or abraded loop) depending upon what stitching may be desired for a particular tire as well as providing more than one stitching configuration on the same tire tread.

In practice, while various electrically non-conductive reinforcing fillers may be used, exemplary of such fillers is silica, although it is to be understood that the practice of this invention is not intended to be limited to silicas as being the only suitable non-conductive reinforcing filler.

Representative of silica fillers, for example and not intended to be limiting, are precipitated silicas. Use of such silicas in the reinforcement of rubber compositions is well known to those having skill in such art.

Representative of various precipitated silicas are those, for example, and without limitation, available from PPG Industries under the Hi-Sil trademark with designations 210, 243, etc; silicas available from Rhone-Poulenc, such as, for example, Zeosil 1165MP and silicas available from Degussa AG with designations such as, for example, VN2, VN3, and BV3370GR and from J. M. Huber as Zeopol 8746.

When silica reinforcement, particularly quantitative silica reinforcement, is desired for a rubber tire tread, particulate, precipitated silica is conventionally used with a coupling agent, or what is sometimes referred to as a silica coupler, capable of reacting with both the silica surface and the rubber elastomer molecule, in a manner to cause the silica to have a reinforcing effect on the rubber, many of which are generally known to those skilled in such art as coupling agents, or couplers, are often used.

In practice, the tire can be built, shaped, molded and cured by various methods which will be readily apparent to those having skill in such art.

The invention may be better understood by reference to the following examples in which the parts and percentages are by weight unless otherwise indicated.

EXAMPLE I

This Example is presented to illustrate a concept of the invention.

Pneumatic rubber tires, identified herein as Tires A, B and C, are prepared of a 265/35R18 type and size. All of the tires have identical carbon black reinforced rubber carcasses with associated beads and sidewalls.

For this Example, the tires were of a tread over sidewall construction, with the tread itself being of co-extruded cap/base/miniwing construction.

All of the treads have the same vulcanized tread design, or surface configuration, of lugs and grooves.

In particular and for this Example, tires A, B and C have a tread construction composed of a co-extrusion of (i) a tread cap and (ii) tread base; wherein the tread cap rubber is quantitatively reinforced with silica and containing a minimal amount of carbon black and where the tread base is quantitatively reinforced with carbon black.

Tire "A" is a control tire with a tread of high electrical resistivity and, thus, a tire of high electrical resistance, but without any stitching of an electrically conductive thread through its tread.

The experimental tire "B" had an electrically conductive filamentary thread stitched through the tread stock prior to building the tread stock onto the tire carcass via an open loop stitching, similar to FIG. 3A.

The experimental tire "C" had an electrically conductive filamentary thread stitched through the tread stock prior to building the tread stock onto the tire carcass via an open loop stitching, similar to FIG. 3A except that the segment of the tread on the outer surface of the tread stock was cut away, similar to FIG. 3C.

The thread had a diameter of about one millimeter and was composed of a multiplicity of cabled filaments of carbon fiber material.

All of the tires, after vulcanization in a suitable mold, had a tread of a rib and groove configuration.

The tires are evaluated for their electrical resistance according to Test WDK 110.

The composition for the tread cap contained the materials shown in the following Table 1. The tread base was composed of natural rubber, cis 1,4-polybutadiene and reinforced with about 50 phr of carbon black.

The aforesaid co-extruded treads are suitably built onto the tire carcasses and the assembly thereof vulcanized in a tire mold at a temperature of about 160° C. for about 15 minutes to form cured pneumatic tires with tread configurations of ribs and grooves.

TABLE 1

(Tread Cap)

| Tires A, B and C | Parts |
|---|---|
| Non-Productive Mix Stages | |
| E-SBR[1] | 25 |
| Isoprene/Butadiene[2] Rubber | 45 |
| Cis 1,4-polybutadiene[3] | 20 |
| Natural Rubber[4] | 10 |
| Processing Aids[5] | 25 |
| Fatty Acid | 2 |
| Silica[7] | 80 |
| Carbon Black, Tread Type | 0 |
| Coupling Agent[8] | 12 |
| Productive Mix Stage | |
| Sulfur | 1 |
| Zinc Oxide | 4 |

TABLE 1-continued (Tread Cap)

| Tires A, B and C | Parts |
|---|---|
| Antioxidant(s)[6] | 3 |
| Sulfenamide and Thiuram Type Accelerators | 4 |

[1]Emulsion polymerization prepared SBR obtainable from The Goodyear Tire & Rubber Company having styrene content of about 40 percent.
[2]Isoprene/butadiene copolymer elastomer having a Tg of about −45° C. and an isoprene content of about 50 percent obtained from The Goodyear Tire & Rubber Company.
[3]Cis 1,4-polybutadiene rubber obtained as BUDENE ® 1207 from The Goodyear Tire & Rubber Company.
[4]Natural rubber (cis 1,4-polyisoprene).
[5]Rubber processing oil as being about 9.4 parts in the E-SBR, where the amount of E-SBR is reported above on a dry weight (without the oil) and in addition, about 15 parts additional rubber processing oil, plasticizers, resins and waxes were added.
[6]Of the di-aryl paraphenylene diamine and dihydro-trimethyl quinoline type.
[7]A silica obtained as Zeosil 1165MP from Rhone-Poulenc.
[8]Obtained as bis-3-(triethoxysilylpropyl) tetrasulfide (50% active) commercially available as X50S from Degussa as a 50/50 blend of the tetrasulfide with N330 carbon black (thus, considered 50% active).

Electrical resistance measurements were conducted on Tires A and B, using Test WDK 110. The results of the tests (average values) are shown in the following Table 2.

TABLE 2

| Tire | Electrical[1] Resistivity |
|---|---|
| A (Control) | Greater than 20,000 |
| B (Open loop stitching) | 0.03 |
| C (Open & cut loop stitching) | 0.17 |

[1]Meg Ohms.

These electrical resistance measurements demonstrate that the application of an electrically conductive stitched to an electrically non-conductive tread can provide a suitable electrical path to dramatically reduce the electrical resistance of the tire between the outer surface of the tread and the tire carcass.

In the practice of this invention, for the electrically non-conductive reinforcing filler, a precipitated silica is used. It is to be understood that when such silica is used in the practice of this invention as a reinforcing filler, it is conventionally used in combination with a silica coupler.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire composed of an electrically conductive carbon black reinforced rubber carcass, which contains two individual sidewalls, and two spaced apart bead portions, and which supports a peripheral, circumferential rubber tread of (a) a unitary rubber composition which has a high electrical resistivity, or of (b) a cap/base construction; wherein a rubber composition of said tread cap and/or said tread base has a high electrical resistivity; wherein the outer surface of the tread is designed to be ground-contacting, and wherein said high electrical resistivity of said rubber composition(s) is evidenced by the tire in the absence of the hereinafter provided stitched electrically conductive filamentary thread, having an electrical resistance of at least 20,000 mega-ohms according to Test WDK 110; wherein said tread has an electrically conductive filamentary, flexible, thread stitched through said tread to create an electrically conductive path from the outer surface of the tread to the electrically conductive tire carcass and to thereby form a tire having an electrical resistance in a range of about one ohm to about ten thousand mega-ohms according to Test WDK 110;

wherein said tire is prepared by a process which comprises stitching an electrically conductive filamentary, flexible thread through an extruded, unvulcanized rubber tread strip; wherein said tread strip is of (a) a unitary rubber composition containing less than about 20 phr of carbon black reinforcement, or of (b) a cap/base construction wherein a rubber composition of said tread cap or said tread base contains less than about 20 phr of carbon black reinforcement; building said tread strip onto the carbon black reinforced rubber tire carcass to create an assembly thereof and vulcanizing said assembly in a suitable mold at an elevated temperature wherein the stitched thread defines stitchings, each stitching having a segment which extends over a portion of the inner surface of said tread strip.

2. The pneumatic tire of claim 1 wherein tread is of a unitary rubber composition.

3. The pneumatic tire of claim 1 wherein the tread is of a cap/base construction wherein the rubber composition of the tread cap contains carbon black reinforcement in an amount of from 5 to about 20 phr.

4. The pneumatic tire of claim 3 wherein said thread is in a form of a plurality of continuous stitchings which extend circumferentially around the tread to provide at least one stitching at a footprint of the tire tread intended to be ground-contacting; wherein each stitching extends through the tread in a manner that a segment of each stitching of the thread extends over a portion of the inner surface of said tread and a segment of each stitching of the thread extends over a portion of the outer surface of the tread intended to be ground-contacting.

5. The tire of claim 3 wherein said stitching is in a form of open loop construction with at least one segment of the thread over a portion of the inner surface of the tread and at least one segment of the thread over a portion of the outer surface of the tread intended to be ground-contacting.

6. The pneumatic tire of claim 3 wherein said segments of said stitched thread which extend over a portion of the outer surface of said tread intended to be ground-contacting are cut, ground or abraded away to form a plurality of sequential open loop thread stitchings which are connected by their segments on the inner surface of the tread; wherein at least one end of the thread of the open loops terminates at the outer surface of the tread intended to be ground-contacting.

7. The pneumatic tire of claim 1 wherein said thread is in a form of a plurality of continuous stitchings which extend circumferentially around the tread to provide at least one stitching at a portion of the tire tread intended to be ground-contacting; wherein each stitching extends through the tread in a manner that a segment of each stitching of the thread extends over a portion of the inner surface of said tread and a segment of each stitching of the thread extends over the a portion of the outer surface of the tread intended to be ground-contacting.

8. The pneumatic tire of claim 1 wherein said segments of said stitched thread which extend over a portion of the outer surface of said tread intended to be ground-contacting are cut, ground or abraded away to form a plurality of sequential open loop thread stitchings which are connected by their segments on the inner surface of the tread; wherein at least one end of the thread of the open loops terminates at the outer surface of the tread intended to be ground-contacting.

9. The pneumatic tire of claim 1 wherein said thread is stitched through the tread in a form of a plurality of continuous open loop stitchings which extend circumferentially around the tread wherein each stitching extends through the tread in a manner that a segment of the thread extends over a portion of the inner surface of said tread and at least one portion of the thread of each stitching extends to, without extending over, an outer surface of the tread intended to be ground-contacting.

10. The tire of claim 1 wherein said stitching is in a form of open loop construction with at least one segment of the thread over a portion of the inner surface of the tread and at least one segment of the thread over a portion of the outer surface of the tread intended to be ground-contacting.

11. The pneumatic tire of claim 1 wherein said thread is of a cabled, multi-filament construction.

12. The pneumatic tire of claim 1 wherein said thread is of a monofilament construction.

13. The pneumatic tire of claim 1 wherein the tread is of a unitary rubber composition which contains carbon black reinforcement in an amount of about 5 to about 20 phr.

14. The pneumatic tire of claim 1 wherein the tread is of a cap/base construction wherein the rubber composition of the tread base contains carbon black reinforcement in an amount of from 5 to about 20 phr.

15. The pneumatic tire of claim 14 wherein said thread is in a form of plurality of continuous stitchings which extend circumferentially around the tread to provide at least one stitching at a portion of the tire tread intended to be ground-contacting; wherein each stitching extends through the tread in a manner that a segment of each stitching of the thread extends over a portion of the inner surface of said tread and a segment of each stitching of the thread extends over a portion of the outer surface of the tread intended to be ground-contacting.

16. The pneumatic tire of claim 14 wherein said segments of said stitched thread which extend over a portion of the outer surface of said tread intended to be ground-contacting are cut, ground or abraded away to form a plurality of sequential open loop thread stitchings which are connected by their segments on the inner surface of the tread; wherein at least one end of the thread of the open loops terminates at the outer surface of the tread intended to be ground-contacting.

17. The tire of claim 14 wherein said stitching is in a form of open loop construction with at least one segment of the thread over a portion of the inner surface of the tread and at least one segment of the thread over a portion of the outer surface of the tread intended to be ground-contacting.

18. The pneumatic tire of claim 1 wherein said filamentary thread is of a non-metallic fiber composed of at least one of carbon fibers, synthetic textile fibers containing a dispersion of electrically conductive material and/or having a coating, shell or sheath of electrically conductive material, and ultra high molecular weight polyethylene of a weight average molecular weight in a range of about 4 million to about 7 million which contains a dispersion of carbon black.

19. A process of preparing a tire which comprises stitching an electrically conductive filamentary, flexible thread through an extruded, unvulcanized rubber tread strip; wherein said tread strip is of (a) a unitary rubber composition containing less than about 20 phr of carbon black reinforcement, or of (b) a cap/base construction wherein a rubber composition of said tread cap or said tread base contains less than about 20 phr of carbon black reinforcement; building said tread strip onto a carbon black reinforced rubber tire carcass to create an assembly thereof and vulcanizing said assembly in a suitable mold at an elevated temperature to form a tire; wherein said tire has an electrical resistance in a range of about one ohm to about 10,000 mega-ohms according to Test WDK 110; wherein the stitched thread defines stitchings, each stitching having a segment which extends over a portion of the inner surface of said tread strip.

20. The process of claim 19 wherein the stitchings of the filamentary thread are positioned in the unvulcanized tread strip by indexing the placement of the stitches with a predetermined location of a tire tread rib or tire tread lug designed to be ground-contacting and which are formed as the tire carcass/tread stock assembly is molded and vulcanized.

21. The process of claim 20 wherein the tread is of a unitary rubber composition which contains carbon black reinforcement in an amount of about 5 to about 20 phr.

22. The process of claim 20 wherein the tread is of a cap/base construction wherein the tread cap contains carbon black reinforcement in an amount of about 5 to about 20 phr.

23. A tire prepared according to the process of claim 22.

24. The process of claim 20 wherein the tread is of a cap/base construction wherein the tread base contains carbon black reinforcement in an amount of about 5 to about 20 phr.

25. A tire prepared according to the process of claim 24.

26. A tire prepared according to the process of claim 19.

27. A pneumatic tire prepared according to the process of claim 19 wherein said thread is of a cabled, multi-filament construction.

28. A pneumatic tire prepared according to the process of claim 19 wherein said thread is of a monofilament construction.

29. A pneumatic tire prepared according to the process of claim 19 wherein said filamentary thread is of a non-metallic fiber composed of at least one of carbon fibers, electrically conductive synthetic textile fibers including cords thereof, and ultra high molecular weight polyethylene of a weight average molecular weight in a range of about 4 million to about 7 million which contains a dispersion of carbon black.

* * * * *